Feb. 23, 1960 R. A. GILLETTE 2,925,871
SYNCHRONIZED MULTIPLE MOTOR HYDRAULIC POWER LIFT
Filed June 8, 1956 2 Sheets-Sheet 2
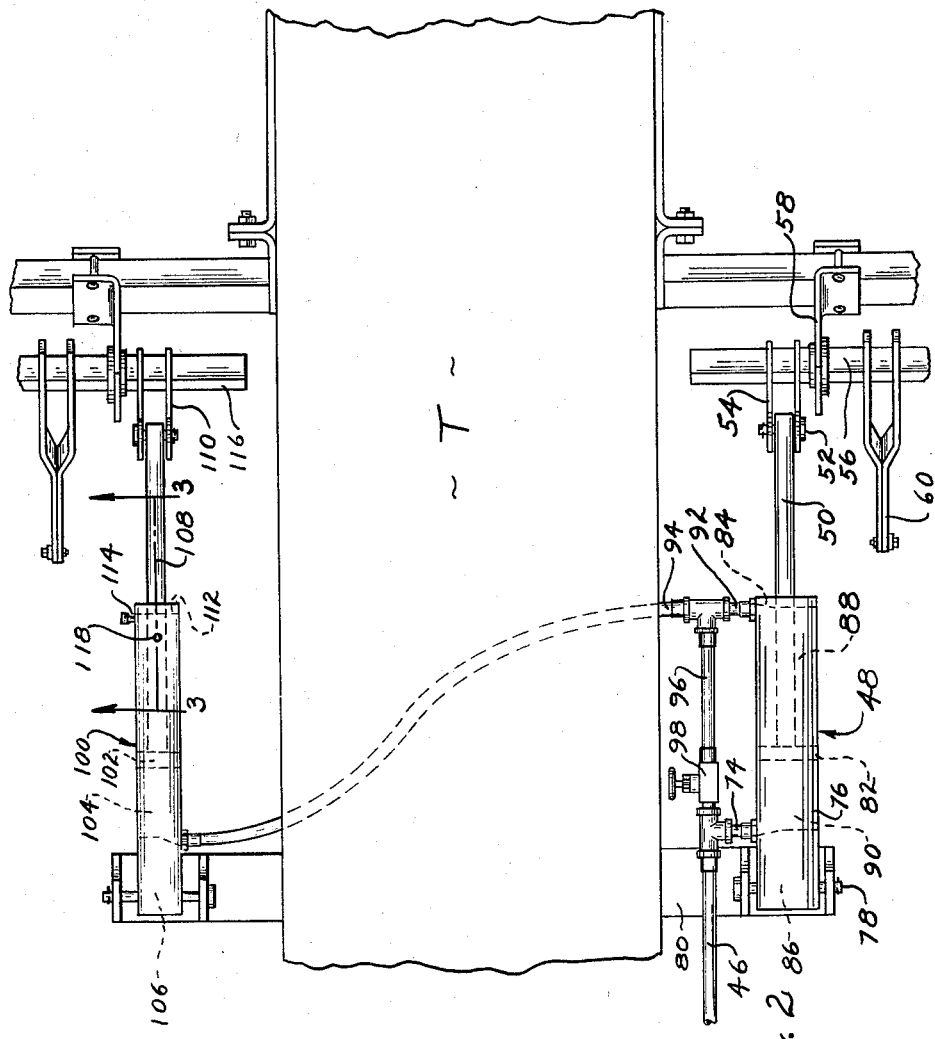
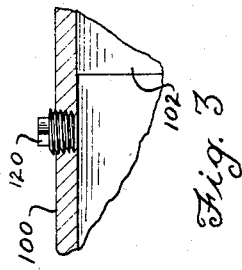
INVENTOR
ROY A. GILLETTE
BY
Emerson B. Donnell
ATTORNEY

United States Patent Office 2,925,871
Patented Feb. 23, 1960

2,925,871

SYNCHRONIZED MULTIPLE MOTOR HYDRAULIC POWER LIFT

Roy A. Gillette, Rockford, Ill., assignor to J. I. Case Company, Racine, Wis., a corporation of Wisconsin Application June 8, 1956, Serial No. 590,123

2 Claims. (Cl. 172—303)

The present invention relates to power lifts of the fluid pressure type and an object thereof is to generally improve the construction and operation of devices of this class.

It is often desirable in the art of lifting implements and similar loads to lift separate portions of a device or separate sections of an implement substantially identical amounts, whether or not the separate sections or portions are actually mechanically or integrally connected. Commonly if this is attempted by means of separate hydraulic cylinders, for example, unless the separate sections are identical in weight and the response or friction in the cylinders is exactly the same, the cylinders will respond inversely in accordance with the respective loads thereon, so that the lighter side, or the one with respect to which the cylinder has the least friction, will be raised first, the other side following later or even remaining stationary until the first side has reached its uppermost position.

A further object of the invention is to avoid this undesirable operation and to provide fluid pressure motors for the two sides or divisions of an implement which, regardless of the variations mentioned, will raise the two sides virtually identical amounts and substantially at the same time.

In other words, the object is to provide synchronized operations of two separate fluid motors, and a further object is to provide expedients for initially conditioning such motors and to provide for restoring synchronization in the event that it is lost from time to time through unavoidable defects in the mechanism, such as deterioration due to wear.

Further objects and advantages will become apparent from the following specification and the accompanying drawings in which an illustrative embodiment of the invention is shown, it being understood, however, that the invention is not to be taken as limited to the construction illustrated or, in fact, in any manner except as defined in the claims.

In the drawings,

Fig. 2 is an enlarged plan view of the same, partly diagrammatic in character, some parts being thrown out of their normal planes to avoid confusion in the showing.

Fig. 3 is a vertical sectional view taken on the line 3—3 of Fig. 2.

Figure 1:
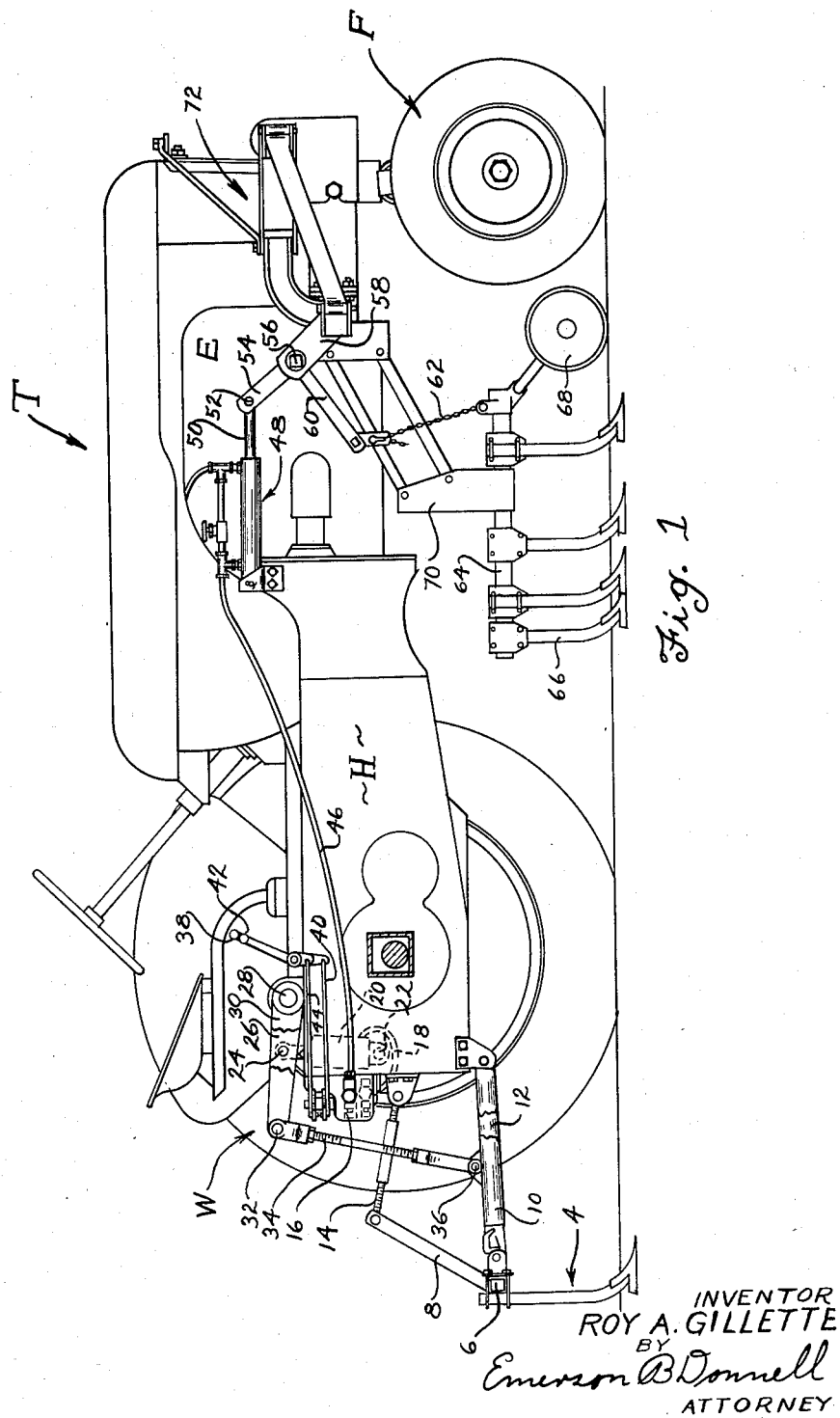
Fig. 1 is a right side elevation of a tractor on which the device embodying the invention is installed, parts of the tractor being removed to show what lies beneath.

Returning to Fig. 1, the tractor, generally designated as T includes a pair of rear traction wheels W one of which has been removed, one or more front wheels F, a transmission housing H and an engine E, all of which are preferably of any suitable or well-known construction not necessary to further describe, since they form no part of the present invention. At the rear of the tractor is located a set of ground working or cultivating rigs, generally designated as 4, carried on a tool bar 6 having a rigid upwardly directed mast 8, the assemblage being connected to the transmission housing H by means of the lower links 10 and 12 and the upper link 14, all of said links being pivotally connected at their ends respectively to tool bar 6, mast 8, and housing H. Rigs 4 therefore may be raised or lowered by up-and-down swinging of links 10, 12, and 14 as is well known.

A power lift housing 16 constituting a source of pressure fluid is carried at the rear of housing H and contains a fluid reservoir, pump, and a plurality of valves of the type shown in the United States patent to Omon, 2,765,746, issued October 9, 1956, to which reference may be made for a full disclosure, a similar arrangement being shown in the patent to Harrington et al. 2,554,990, which issued March 13, 1951.

A conduit 18 leads from power lift housing 16 to an extensible fluid motor 20 anchored at 22 on housing H and pivoted at 24 to a lever 26 fixed on and rockable with a shaft 28 rockably supported on housing H. Shaft 28 also has a lever 30 extending rearwardly and pivoted at 32 to a link 34 extending downwardly and pivoted at 36 to above-mentioned link 10.

A substantially identical link, not shown, is pivoted to lever 26 and extends to above-mentioned link 12. Extension of fluid motor 20 will therefore cause rocking of levers 26 and 30 and accordingly of links 10 and 12 together with raising of rigs 4.

A control lever 38 is connected through a link 40 with a control valve within power lift housing 16, as disclosed in said Omon patent, and operable to direct pressure fluid into conduit 18 and to allow it to exhaust in response to actuation of lever 38.

In like manner, a lever 42 through a link 44 actuates a similar valve in housing 16, forming no part of the present invention, which is operable to direct pressure fluid through a conduit 46 for actuating a fluid motor generally designated as 48.

Fluid motor 48 includes a piston rod 50 which is extended to the right as shown in Fig. 1 in response to pressure fluid flowing to motor 48 through conduit 46. Piston rod 50 is pivoted at 52 to an arm 54 fixed on a rock shaft 56 journaled on a bracket 58 supported on tractor T. Rock shaft 56 has an arm 60 fixed therewith and connected, in the present instance through a chain 62, to a rig frame 64 carrying a plurality of ground engaging tools 66 and a gage wheel 68, the assemblage being connected to tractor T through a parallel motion generally designated as 70, all of which may be of conventional construction, forming no part of the invention.

As will be apparent, extension of piston rod 50 will cause raising of rig frame 64 and its attached parts.

A bracket assembly generally designated as 72 is fixed on tractor T to act as a foundation for parallel motion 70 and bracket 58.

Turning to Fig. 2, conduit 46 connects with a branch 74 leading into a cylinder 76 forming the major portion of motor 48 and pivoted at 78 to a bracket 80 fixed on tractor T in any suitable manner. Cylinder 76 has a piston or movable displacer element 82 slidable therein in fluid-tight manner and connected to piston rod 50, a head 84 closing the right or forward end of cylinder 76 and the space about piston rod 50 also in fluid-tight manner not necessary to illustrate. A head 86 closes the opposite or left end of cylinder 76 and, as will be apparent, piston 82 divides fluid motor 48 into a forward displacement chamber 88 and a rearward displacement chamber 90. Assuming both these chambers full of fluid, for example oil, pressure fluid introduced through conduit 46 and branch 74 into chamber 90 will cause rightward or forward movement of piston 82 and raising of rigs 56 as aforesaid.

A branch 92 leads out of forward chamber 88 into a conduit 94. Branches 74 and 92 are connected by a by-pass passageway 96 for a purpose to be described but which is normally closed in fluid-tight manner by a valve 98.

Conduit 94 leads to a cylinder generally designated as 100 in which is defined by a piston or movable displacer element 102 a rearward displacement chamber 104, the rearward end of cylinder 100 being closed by a head 106.

Piston 102 slides in cylinder 100 in fluid-tight manner and has a piston rod 108 connected to an arm 110 in the present instance in a manner identical to the connection of piston rod 50 with arm 54, and the forward end of cylinder 104 is closed by a head 112 which, however, need not form a fluid-tight seal with piston rod 108. In fact, the forward chamber defined in cylinder 100 is preferably vented to the atmosphere through an air filter or other suitable fitting 114. It will now be apparent that rightward or forward movement of piston 82 will displace a quantity of fluid from chamber 88 which will flow through branch 92 and conduit 94 into chamber 104 of cylinder 100 and will cause rightward or forward movement of piston 102. This movement will cause rocking of rock shaft 116 by reason of the connection of piston rod 108 with arm 110 and such movement will be in some direct proportion to the movement of piston 82, the movement being proportional to the respective areas of pistons 82 and 102 except for the fact that piston rod 50 occupies part of the capacity of chamber 88 and therefore reduces the displacement of piston 82 with regard to chamber 88 as compared with chamber 90.

In the present instance, it is desirable for rock shaft 116 to move an amount identical with rock shaft 56 and therefore it is desirable for piston rod 108 to move an amount identical with movement of piston rod 50. Therefore, the area of piston 102 presented to chamber 104 is made the same as the area of piston 82 presented to chamber 88. In other words, the area of piston 82 (presented to chamber 90) minus the cross-sectional area of piston rod 50 is made equal to the area of piston 102 presented to chamber 104. In a cylinder type motor, the displacement is normally proportional to the linear travel of the piston thereof, and since the volume of fluid displaced from chamber 88 will be identical with the volume of fluid introduced into chamber 104 and the areas of the displacement elements in chamber 88 and chamber 104 are identical, the linear movement of piston 82 will be duplicated by piston 102.

These conditions will continue, assuming chamber 104 and also cylinder 48 including chambers 90 and 88 and all pipes, branches, etc. full of fluid—necessarily hydraulic fluid or liquid. There is, however, somewhat of a problem in setting up and adjusting the apparatus in the first instance. For example, if there is insufficient fluid in chambers 88 and 104, piston 102, while it will travel the same direction as piston 82, will not travel as far as piston 82 and will fail to reach the end of cylinder 100 when the piston 82 reaches the end of cylinder 48. Conversely, in the lowering operation, assuming conduit 46 connected to exhaust, piston 102 will reach head 106 before piston 82 reaches head 86 so that movement of piston 82 will be blocked by atmospheric pressure in chamber 90 or, if rigs 56 are sufficiently heavy, piston 82 will continue to move and will form a void or vacuum in chamber 88, which is highly undesirable. The necessary procedure to avoid these difficulties is readily performed by means of valve 98.

Assuming both cylinders 48 and 100 empty, fluid under pressure is introduced through conduit 46 by suitable manipulation of lever 42 with valve 98 closed, and flows into chamber 90, forcing piston 82 to the right and raising rig 66. This is continued until the rig is at its maximum height and piston 82 is resting against head 84. Insofar as chamber 84 is concerned, piston 82 will compress the air normally present which will cause a rise in pressure in conduit 94 and chamber 104, but probably insufficient to raise the rigs connected with the rock shaft 116 or, in any event, insufficient to raise them to their maximum height. While pressure is maintained in conduit 46, valve 98 is opened, preferably slightly, and hydraulic fluid is permitted to flow through bypass 96 and downwardly through branch 92 (it being understood that branch 98 enters on the upper side of cylinder 48 as shown in Fig. 1, Fig. 2 being diagrammatic, as aforesaid) until chamber 88 is full of hydraulic liquid, the remainder of the air in chamber 88 being displaced through conduit 94 into chamber 104. This action will cause further movement of piston 102, partly by reason of air pressure and partly by reason of liquid pressure, until piston 102 rests against head 112, air in the space forwardly of piston 102 being exhausted through vent 114. At this point, piston 102 will have moved forwardly of the bleed port 118 which is of suitable or well known type and closed by any suitable means as a pipe plug or the like 120. With the pressure on, plug 120 is loosened, whereupon the air under pressure will be allowed to escape about the screw threads of the plug while additional hydraulic fluid is supplied through valve 98 and bypass 96. When no further air escapes about plug 120, the latter is again tightened and valve 98 is closed after which the system operates as heretofore described, pistons 82 and 102 performing identical movements in response to the actuation of lever 42 in controlling fluid pressure source 16.

The two hydraulic cylinders will not normally "get out of step" but substantially perfect sealing is required of pistons 82 and 102, and head 104, and as these parts deteriorate after long use, it may be possible that one or the other of piston rods 50 and 108 may lag somewhat in its movement behind the other. Thus, if piston 82 permits the passage of fluid, over a period of time piston rod 50 will possibly lag behind piston rod 108. In this case, with the pressure in conduit 46 exhausted, valve 98 may be opened and will allow fluid to pass from chamber 104 directly to conduit 46. In this manner piston 102 will be allowed to rest against head 106 and thereby get back into synchronization with piston 82. When the correction is completed, valve 98 is closed, as will be apparent.

On the other hand, if piston 102 or head 84 should leak, fluid would be lost from chamber 104 or chamber 88 and piston 102 would lag with respect to piston 82. In this event, with pressure on conduit 46, piston 82 will be resting against head 84 and if valve 98 is momentarily opened, fluid will flow directly to chamber 104 and advance piston 102 into contact with head 112 so that the piston 102 will again be restored to synchronization, valve 98 being then closed, as before.

It is understood, of course, that the proper remedy would be to correct the leak, but as a practical matter the apparatus can be temporarily restored to substantially correct operation.

It is to be understood that rigs identical with rigs 66 are intended to be connected with rock shaft 116 and that the front rigs can be operated either simultaneously with rigs 4 or if preferred (and which is commonly the case), rigs 66 may be raised in advance of rigs 4 when leaving the field by merely actuating lever 42 in advance of lever 38. When entering a field, commonly rigs 66 are lowered first by actuation of lever 42, rigs 4 being dropped slightly later as they leave the margin of the field.

The operation of the invention is thought to be clear from the foregoing description, it being apparent that a simple system has been devised whereby individual implement parts may be caused to perform identical (or desired proportional) movements without the necessity of any structural or mechanical connection between the movable parts, and that provision has been made for readily putting the apparatus into operation, synchronizing the two portions, and correcting such synchronization in the event that it is disturbed by leakage, escape of the fluid, vaporization, etc.

What is claimed as new and desired to be secured by Letters Patent of the United States is:

1. In a power lift for a tractor mounted implement the combination of a source of pressure fluid, a control valve connected with said pressure fluid source and adapted to control pressure fluid emanating from said source, a double-acting type of fluid displacement motor supported from the tractor and having a first movable displacer element, a first set of earth working rigs supported from the tractor and connected with said first movable displacer element, a single-acting type of fluid displacement motor supported from the tractor and having a second movable displacer element, a second set of earth working rigs supported from the tractor and connected with said second movable displacer element, first conduit means connected from said control valve to said double-acting type of fluid displacement motor at one side of said first movable displacer element, second conduit means connected from said double-acting type of fluid displacement motor at the opposite side of said first movable displacer element and to said single-acting type of fluid displacement motor, connected to deliver fluid to one side of said second movable displacer element, a bypass passageway interconnecting said first and said second conduit means, valve means interposed in said bypass passageway and a bleed port in said single-acting type of fluid displacement motor.

2. In a power lift on a tractor for a divided load of cultivator tools of the type wherein left rigs and right rigs are movably mounted on said tractor and in which it is important that the left and right rigs be lifted equivalent distances, the combination of a first cylinder pivotally mounted on the right side of said tractor, a first piston movable therein, a first piston rod extending forwardly from said first piston out of said first cylinder and connected to said right rig for raising the same, a head for said first cylinder closing the space about said first piston rod and forming a fluid-tight seal therewith whereby said first piston divides said first cylinder into a front displacement chamber about said first piston rod and a first rear displacement chamber, a second cylinder pivotally mounted on the left side of said tractor, a second piston movable therein and defining therewith a second rear displacement chamber, a second piston rod extending forwardly from said second piston out of the end of said second cylinder opposite from said second rear displacement chamber and connected to said left rig for raising the same, a source of pressure fluid, valve means controlling fluid from said source, first conduit means connected from said valve means to said first rear displacement chamber, second conduit means connected between said front displacement chamber and said second rear displacement chamber, means providing a passageway interconnecting said first and said second conduit means, a valve in said passageway for maintaining it normally closed, and a bleed port in said second cylinder, the diameters of said cylinders and said first piston rod being such that the area of said first piston less the area of said first piston rod, will equal the area of said second piston as exposed to said second rear displacement chamber, whereby a predetermined amount of travel of said first piston in one direction will displace an amount of fluid through said second conduit means and into said second rear displacement chamber sufficient to cause movement of said second piston substantially identical to the movement of said first piston.

References Cited in the file of this patent
UNITED STATES PATENTS

| | | |
|---|---|---|
| 2,100,445 | Le Bleu | Nov. 30, 1937 |
| 2,112,466 | Maloon | Mar. 29, 1938 |
| 2,301,122 | Kellert | Nov. 3, 1942 |
| 2,368,156 | Orelind | Jan. 30, 1945 |
| 2,518,363 | Orelind | Aug. 8, 1950 |
| 2,567,670 | Iversen et al. | Sept. 11, 1951 |